Dec. 5, 1967   C. CONSTANT   3,356,123
APPARATUS AND METHOD FOR CONCENTRATING PHOSPHORIC ACID
Filed June 15, 1965   2 Sheets-Sheet 1

INVENTOR:
CLINTON CONSTANT
BY
Carl C. Batz
ATT'Y

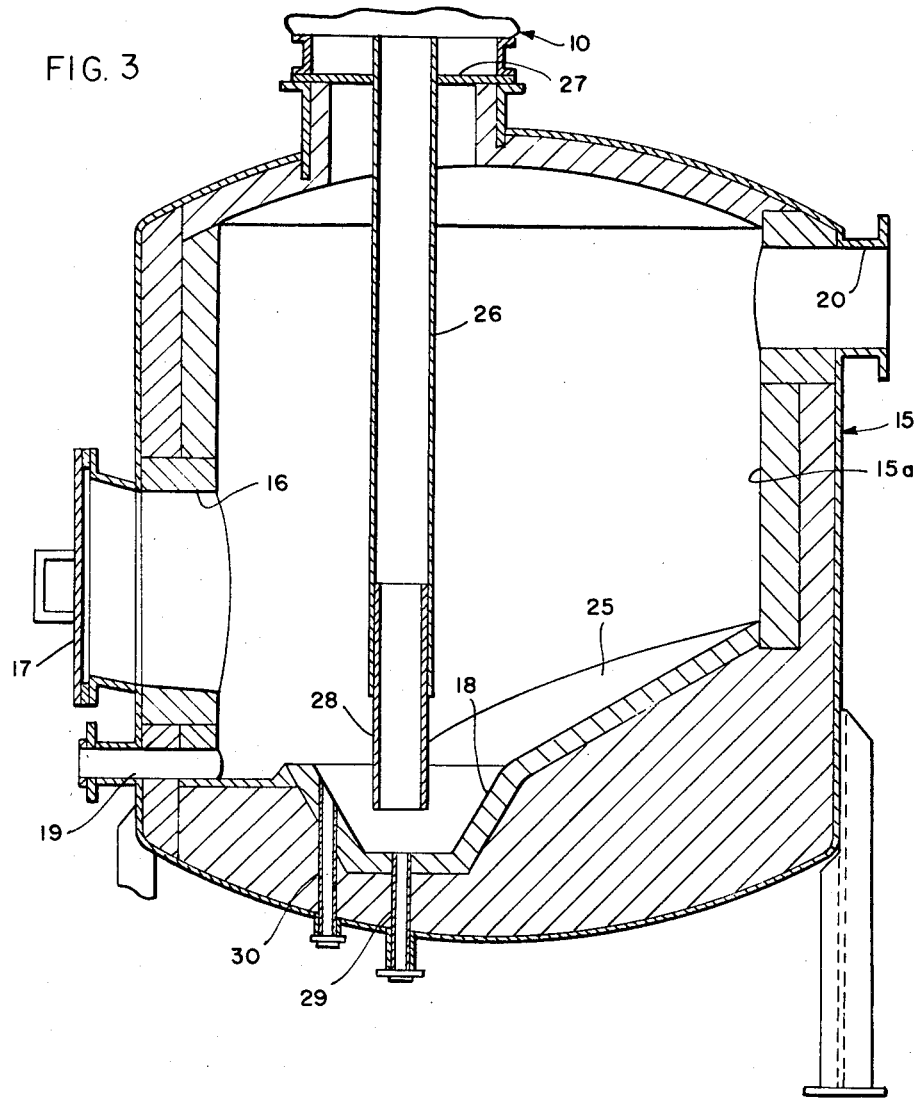

3,356,123
Patented Dec. 5, 1967

3,356,123
APPARATUS AND METHOD FOR CONCENTRATING PHOSPHORIC ACID

Clinton Constant, Atlanta, Ga., assignor, by mesne assignments, to Armour Agricultural Chemical Company, a corporation of Delaware
Filed June 15, 1965, Ser. No. 464,033
5 Claims. (Cl. 159—16)

This invention relates to apparatus and method for concentrating phosphoric acid and similar liquids. The invention is particularly useful in the concentrating of wet process phosphoric acids.

An object of the invention is to provide means and methods for rapid and uniform dehydration of phosphoric acid and the like. A further object is to provide apparatus and process steps for bringing wet process phosphoric acid into intimate contact with hot combustion gases for effective removal of water and with a relatively low average retention time of the acid in the evaporator. A still further object is to provide dehydration apparatus having a plurality of dip pipes extending into an arcuate well within the dehydrator and with an upwardly-inclined run back shelf on one side of the well and a concentrated liquid outlet on the other side thereof. Yet another object is to provide in such a structure acid inlets within the well and opposite the outlet ends of the dip pipes. Other specific objects and advantages will appear as the specification proceeds.

Figure 1:
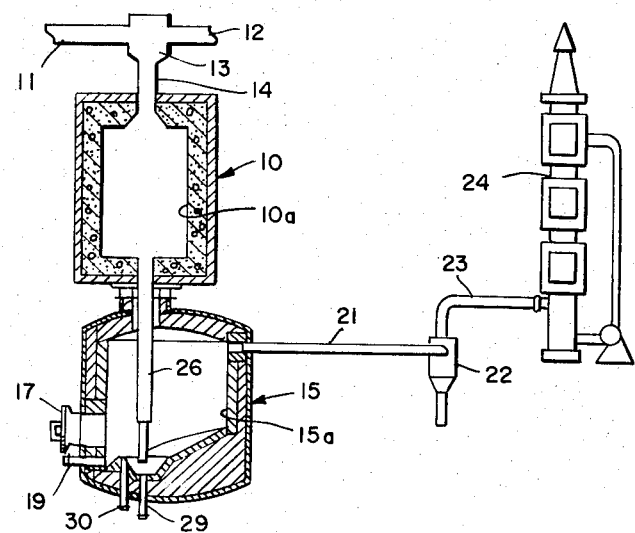
Figure 2:
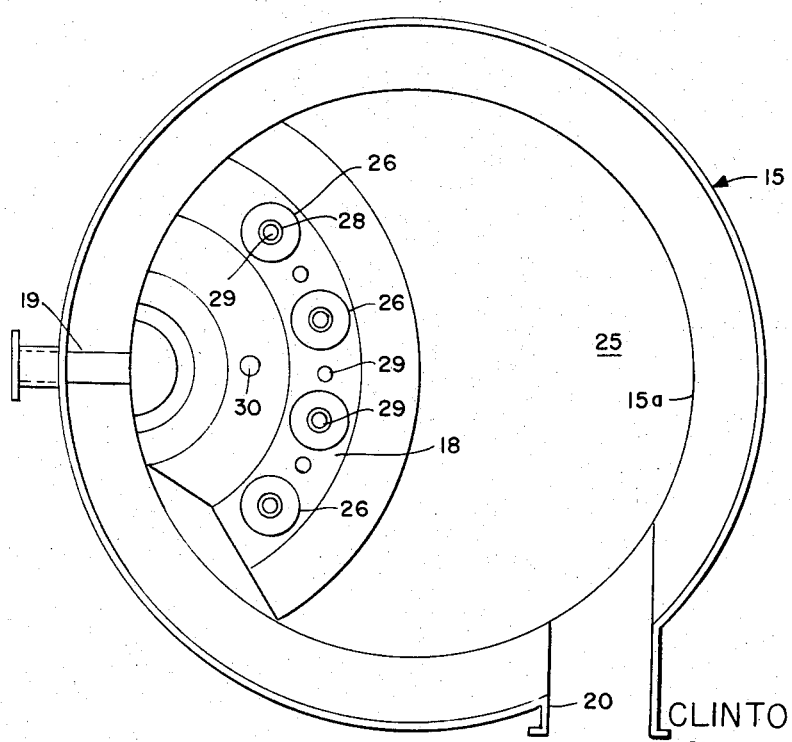

The invention is shown in an illustrative embodiment by the accompanying drawings, in which:

FIGURE 1 is a diagrammatic and part-sectional view of apparatus embodying the invention and which may be employed in the practice of the method steps constituting the invention; FIG. 2, a top plan view on an enlarged scale of the evaporator vessel with the upper top portion of the vessel removed and omitting the manhole structure; and FIG. 3, a vertical sectional view of the dehydrator vessel shown in FIG. 2.

In the illustration given in FIG. 1, 10 designates a furnace or combustion chamber. A suitable fuel gas, such as propane, is introduced from a source of supply through pipe 11, and air is introduced from a blower through pipe 12. The gases enter a vortex burner 13 and are discharged into the combustion chamber through pipe 14. The furnace 10 is provided with an inner lining 10a, as shown in FIG. 1.

The dehydration vessel 15 shown in FIGS. 1, 2 and 3 is provided also with lining 15a, which preferably is in the form of carbon brick lining. On one side of the dehydrator there is shown a manhole opening 16 provided with a cover 17. The insulation within the dehydrator provides an arcuate dehydrator well 18, and in line with the upper end of the well is a drawoff pipe 19 from which the concentrated phosphoric acid is recovered.

The dehydrator vessel is provided near its top with a vapor outlet pipe 20 which communicates with a duct 21 through which pass the moisture-laden gases which disengage from the acid in the space above the evaporator bottom. Entrained acid droplets are removed from the vapor in the separator 22 and may be returned to the product receiver. The gases freed of the acid droplets continue through duct 23 to the floating bed scrubber 24 where condensable and water-soluble pollutants are removed. In the dehydrator 15 there is provided on one side of the well 18 an upwardly-inclined dished shelf 25 which provides a relatively wide area from which vapor may disengage from liquid flowing upon the shelf while at the same time draining the liquid back into the well 18.

Four dip pipes 26 are suspended from a plenum plate 27 secured to the furnace 10, and each of the dip pipes is provided with an extension tip 28, preferably formed of corrosion-resistant metal, such as Nionel, and which extends into the well 18. The dip pipes 26, as shown best in FIG. 2, are in spaced relation and extend downwardly within the well 18.

Feed acid is introduced into the bottom of the well 18 through inlet pipes 29. Preferably, the inlet pipes are located at points directly below the dip pipes 26, but if desired some inlet pipes may be located between the dip pipes. A thermocouple well 30 may be provided along one side of the well 18, and a thermocouple (not shown) may be employed for observing the temperature of the acid feed undergoing dehydration.

In the operation of the apparatus and method, feed acid which may be wet process phosphoric acid, such as, for example, 54 weight percent $P_2O_5$ phosphoric acid, etc., is fed through inlet pipes 29 into well 18, and preferably at points below the dip pipes 26, while at the same time combustion gases formed in furnace 10 are discharged through the four dip pipes 26 into the well 18. The hot gases may, if desired, be diluted with air to bring them within a preferred temperature of 1600–2000° F., and preferably to about 1750° F. Moisture-laden gases disengage from the liquid within the dehydrator vessel and are carried off through pipe 21, while dehydrator or concentrated phosphoric acid is withdrawn through pipe 19 to a product receiver (not shown). Acid droplets entrained by the gases are separated in the separator 22 and may also be returned to the product receiver. The gases proceed through pipe 23 to the tower or scrubber 24 where condensable and water-soluble poluble pollutants are removed.

In the foregoing operation, the discharge of hot combustion gases creates turbulence within the well 18, and the liquid acid is drawn upwardly along the inclined shelf 25 where water vapors separate and pass upwardly while acid runs back into the well 18. Concentrated acid overflows through pipe 19, as stated above, and passes to a water-cooled receiver.

Specific examples illustrative of the process and apparatus may be set out as follows:

Example I

Wet process phosphoric acid feed having a $P_2O_5$ content of 54.6 percent was fed through inlets 29 into well 18. Hot gases produced in the combustion chamber 10 (using propane and air) were admitted to the dip pipes 26 and directed upon the acid in the arcuate well 18. The acid pool was maintained at a temperature of 690° F., plus or minus 2° F. The feed acid was admitted at the rate of 1.3 gallons per minute, and the product withdrawal rate was about 0.9 gallon per minute. The temperature of the effluent product acid was about 640° F. The moisture-laden gases were disengaged in the space above the acid pool at a temperature of about 765° F. The conversion of the orthophosphoric acid to polyphosphoric acid was approximately 72 percent.

Example II

Feed acid as described in Example I was fed into the evaporator, as illustrated in FIGS. 1 to 3 of the drawings, and the combustion gases were maintained at a temperature of 1750° F. The acid pool temperature was controlled at 585° F., plus or minus 2° F. The feed rate was 1.4 gallons per minute, and the product withdrawal was 1.0 gallon per minute. The product acid was withdrawn from the evaporator at a temperature of 535° F. The conversion of orthophosphoric acid to polyphosphoric acid was 58 percent, the concentrated product having a $P_2O_5$ content of 83 percent. The product was black in color and had a citrate insolubility of 0.7 percent and a water insolubility of 0.5 percent. The viscosity was 12,000 cps. at 80° F., and the specific gravity 2.0.

While in the foregoing specification, there has been set forth specific structure and procedure in considerable detail for the purpose of illustrating embodiments of the invention, it will be understood that such details may be varied widely by those skilled in the art without departing from the spirit of the invention.

I claim:

1. In liquid concentration apparatus, a dehydrator vessel having in the lower portion thereof an elongated arcuate well adapted to receive liquid to be dehydrated, a plurality of dip pipes suspended in said vessel and arranged in an arc coincident with the arc of said well, said pipes having their lower ends in said well, and means for introducing hot gases into said dip pipes.

2. The structure of claim 1 in which a liquid overflow for the concentrated liquid extends outwardly from the central area of said well arc.

3. In apparatus for concentrating phosphoric acid, a lined dehydrator vessel provided with acid inlets and outlets and a vapor outlet, said vessel having in the lower portion thereof an arcuate well, a plurality of dip pipes suspended in said vessel and arranged in an arc coincident with the arc of said well, said dip pipes having their lower ends in said well, means for withdrawing concentrated acid centrally of said well and means for introducing hot gases into said dip pipes.

4. In apparatus for concentrating phosphoric acid, a dehydration vessel provided with an acid inlet and outlet and, in the upper portion of the vessel, with a vapor and gas outlet, said vessel having in the lower portion thereof a well having upwardly- and outwardly-inclined side walls, an upwardly- and laterally-declined run back shelf, of lesser pitch than that of said well walls, communicating with said well and spreading heated acid thereon for the separation of water vapors, a dip pipe extending into said well, and means for supplying combustion gases to the upper portion of said dip pipe.

5. The structure of claim 4 in which said run back shelf extends to a point under said vapor outlet for returning to said well acid freed of said water vapors.

References Cited

UNITED STATES PATENTS

| | | | |
|---|---|---|---|
| 1,264,509 | 4/1918 | Hechenbleikner | 23—275 |
| 1,314,485 | 8/1919 | Davis | 23—307 |
| 2,522,475 | 9/1950 | Walker | 23—307 X |
| 2,982,624 | 5/1961 | Schultz | 23—307 |
| 3,104,947 | 9/1963 | Switzer et al. | 159—16 X |
| 3,276,443 | 10/1966 | Austin et al. | 126—360 |
| 3,276,510 | 10/1966 | Austin et al. | 159—16 |
| 3,279,526 | 10/1966 | Mustian | 159—16 X |

NORMAN YUDKOFF, *Primary Examiner.*

J. SOFER, *Assistant Examiner.*